United States Patent
Kobayashi et al.

(10) Patent No.: US 8,305,856 B2
(45) Date of Patent: Nov. 6, 2012

(54) DISK-SHAPED RECORD MEDIUM AND PRODUCING METHOD FOR SAME, DISK RECORDING METHOD AND DEVICE, AND DISK PLAYBACK METHOD AND DEVICE

(75) Inventors: Shoei Kobayashi, Kanagawa (JP); Tamotsu Yamagami, Kanagawa (JP); Yuji Takagi, Osaka (JP); Makoto Usui, Osaka (JP); Paulus Gijsbertus Petrus Weijenbergh, Eindhoven (NL); Bart Van Rompaey, Eindhoven (NL)

(73) Assignees: Sony Corporation, Tokyo (JP); Matsushita Electric Industrial Co., Ltd., Osaka (JP); Koninklijke Philips Electronics N.V., Ba Eindhoven (NL)

( * ) Notice: Subject to any disclaimer, the term of this patent is extended or adjusted under 35 U.S.C. 154(b) by 620 days.

(21) Appl. No.: 12/088,129

(22) PCT Filed: Sep. 29, 2006

(86) PCT No.: PCT/JP2006/320015
§ 371 (c)(1),
(2), (4) Date: Sep. 12, 2008

(87) PCT Pub. No.: WO2007/037537
PCT Pub. Date: Apr. 5, 2007

(65) Prior Publication Data
US 2009/0034383 A1    Feb. 5, 2009

(30) Foreign Application Priority Data
Sep. 30, 2005    (JP) .................... 2005-288428

(51) Int. Cl.
*G11B 7/00* (2006.01)

(52) U.S. Cl. ............... 369/53.17; 369/275.3; 369/59.25; 369/47.27

(58) Field of Classification Search ............... 369/275.3, 369/59.25, 53.17, 47.27
See application file for complete search history.

(56) References Cited

U.S. PATENT DOCUMENTS

| | | | |
|---|---|---|---|
| 5,930,367 A | 7/1999 | Osawa et al. | |
| 7,257,075 B2 * | 8/2007 | Kim et al. | 369/275.3 |
| 7,440,389 B2 * | 10/2008 | Noda et al. | 369/275.3 |
| 2007/0097843 A1 * | 5/2007 | Noda et al. | 369/275.3 |
| 2007/0147211 A1 * | 6/2007 | Noda et al. | 369/59.25 |
| 2010/0008210 A1 * | 1/2010 | Kim et al. | 369/275.3 |

FOREIGN PATENT DOCUMENTS

| | | |
|---|---|---|
| EP | 1 526 531 | 4/2005 |
| JP | 63 140461 | 6/1988 |

(Continued)

*Primary Examiner* — Thuy Pardo
(74) *Attorney, Agent, or Firm* — Frommer Lawrence & Haug LLP; William S. Frommer; Paul A. Levy (57) ABSTRACT

To record specific information to a disk-shaped record medium and reproduce the recorded specific information without any influence on the error correction capability. Copy protection information (CPID) having an error correction code appended thereto, shuffled and otherwise treated is sent as a CPID bit block to an EDC rewrite circuit (14). The EDC rewrite circuit (14) rewrites an error detection code appended to user data in each sector in accordance with bit information in the CPID bit block. Thereafter, the data in each sector is scrambled, and an ECC block including a plurality of sectors is modulated with an error correction code and sync signal appended thereto. The modulated signal is recorded in a reserve area of a lead-in area of the disk-shaped record medium. During reproduction, CPID is restored based on the result of error detection of each sector.

10 Claims, 9 Drawing Sheets

FOREIGN PATENT DOCUMENTS

| | | |
|---|---|---|
| JP | 9 128890 | 5/1997 |
| JP | 11 86436 | 3/1999 |
| JP | 2003 198831 | 7/2003 |
| JP | 2003 281823 | 10/2003 |
| JP | 2003 308651 | 10/2003 |
| WO | WO 02 43065 | 5/2002 |

* cited by examiner

DISK-SHAPED RECORD MEDIUM AND PRODUCING METHOD FOR SAME, DISK RECORDING METHOD AND DEVICE, AND DISK PLAYBACK METHOD AND DEVICE

TECHNICAL FIELD

The present invention relates to a disk-shaped record medium having digital signals recorded therein and a method of producing the disk-shaped record medium, a disk recording method of, and device for, recording digital signals to the disk-shaped record medium, and a disk playback method of, and a device for, reproducing digital signals recorded in the disk-shaped record medium.

BACKGROUND ART

For recording digital signals such as a content signal on a record medium, an error detection code (EDC) and error correction code (ECC) have been appended to such digital signals.

On this account, when a record medium having, for example, the above digital signals recorded therein is played, the digital signals read from the record medium is subjected to an error detection using the error detection code (EDC) and error correction using the error correction code to reproduce the digital signals.

[Patent Document 1] Japanese Patent No. 3580041

DISCLOSURE OF THE INVENTION

Problems to be solved by the invention

These days, record media having digital signals such as a content signal recorded therein, including a CD (Compact Disk), CD-ROM (Compact Disk-Read Only Memory), DVD (Digital Versatile Disk), etc., are prevalent over the world.

It is well-known to read signals recorded in a record medium such as a CD, CD-ROM, DVD or the like, make the above error correction of the signals to reproduce all the digital signals, copy the reproduced digital signals to a rewritable/readable record medium such as a hard disk, and then supply the digital signals copied to the hard disk to an encoding system for a CD, CD-ROM, DVD or the like to produce a new CD, CD-ROM, DVD or the like. In this case, the new CD, CD-ROM, DVD or the like will have recorded therein exactly the same digital signals as the original digital signals.

If it is repeated to produce a new record medium on the basis of a record medium as above, it will not be known whether the digital signals recorded in the new record medium are, original or illegally copied digital signals.

Therefore, it has been desired that it can be judged whether digital signals recorded in a record medium are original or copied ones and a record medium in which digital signals are illegally copied cannot be played.

On this account, the patent document 1 discloses a technique for judging whether digital signals are original or copied ones in which specific information such as identification information indicating whether the digital signals are original or copied ones are recorded by substituting a part of error correction codes appended to the digital signals, separately from the digital signals, and the specific information is extracted from the part of the error correction codes at the time of playing the record medium in which the digital signals are recorded.

However, the technique disclosed in the patent document 1 is disadvantageous in that the error correction capability is lower because the specific information is recorded with a part of the error correction code appended to the digital signals being substituted. Therefore, it has been desired to record the specific information and reproduce the recorded specific information, without a part of the error correction code being substituted.

The present invention has an object to overcome the above-mentioned drawbacks of the related art by providing a disk-shaped record medium having specific information recorded therein without affecting the error correction capability and a producing method for the disk-shaped record medium, a method of, and device for, recording specific information in the disk-shaped record medium, and a method of, and device for, reproducing specific information recorded in the disk-shaped record medium.

The above object can be attained by providing a disk-shaped record medium in which at least a predetermined signal is recorded on a sector basis in a first area, wherein each sector of the first area includes first data and an error detection code encoded based on the first data, and a part of the error detection code and/or the first data is changed in accordance with bit information in second data.

Also, the above object can be attained by providing a method of producing a disk-shaped record medium including the steps of appending an error detection code to first data, making a stamper by changing a part of the error detection code and/or the first data in accordance with bit information in second data and recording in a first area of a master disk the first data and error detection code thus changed in accordance with the bit information in the second data as a signal of each sector, and producing the disk-shaped record medium using the stamper.

Also, the above object can be attained by providing a disk recording method and device, wherein an error detection code is appended to first data, a part of the error detection code and/or the first data is changed in accordance with bit information in second data, and the first data and the error detection code thus changed in accordance with the bit information in the second data are recorded as a signal of each sector in a first area of a disk-shaped record medium.

Also, the above object can be attained by providing a disk playback method and device for playing a disk-shaped record medium in which at least a predetermined signal is recorded on a sector basis in a first area, wherein each sector of the first area includes first data and an error detection code encoded based on the first data, a part of the error detection code and/or the first data is changed in accordance with bit information in second data, error detection is carried out on each sector of the first area, and the second data is restored in accordance with the result of error detection of each sector.

According to the present invention, specific information, for example, key information for copy protection of a content signal, can be recorded in a disk-shaped record medium, and the specific information recorded in the disk-shaped record medium can be reproduced, without influence on the error correction capability.

BEST MODE FOR CARRYING OUT THE INVENTION

The present invention will be described in detail below concerning embodiments thereof with reference to the accompanying drawings.

Figure 1:
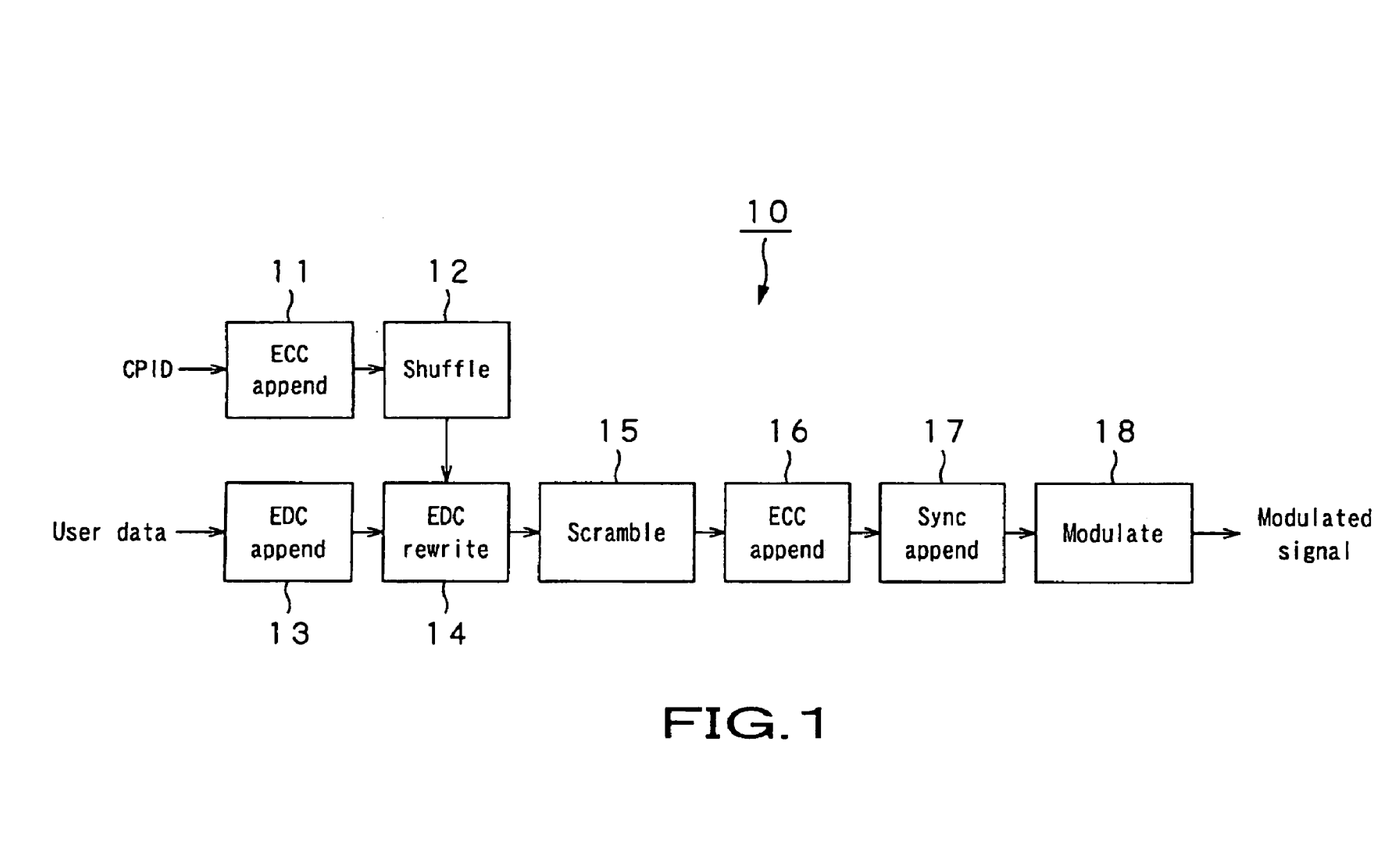
FIG. 1 shows a schematic block diagram of the record signal generator as an embodiment of the present invention.

Referring now to FIG. 1, there is schematically illustrated in the form of a block diagram a record signal generator for generating a record signal including copy protection information (CPID) as specific information that is recorded in an optical disk. As shown in FIG. 1, the record signal generator 10 includes an ECC (Error Correction Code) appending circuit 11, a shuffling circuit 12, an EDC (Error Detection Code) appending circuit 13, an EDC rewrite circuit 14, a scrambling circuit 15, an ECC appending circuit 16, a sync appending circuit 17, and a modulation circuit 18.

Note that in this embodiment, it is assumed that CPID as the specific information includes 128 bits (16 bytes). Also, it is assumed that the sector as one unit for recording in the optical disk includes user data of 2 Kbytes (2048 bytes) as a first data, a sector header of 10 bytes and EDC of 4 bytes, and an ECC block (cluster) as one RW unit includes 16 sectors.

Figure 2:
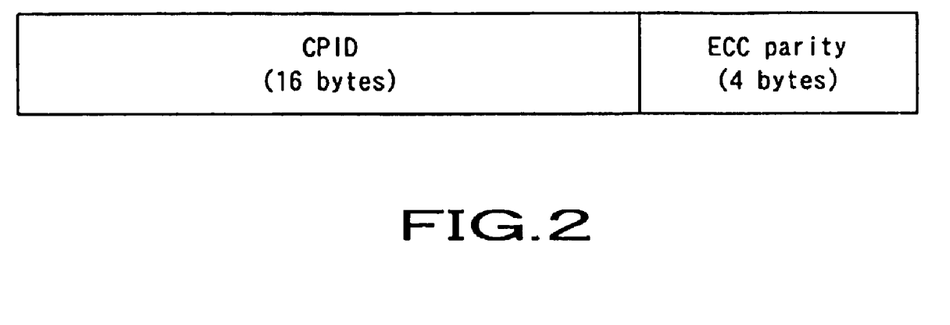
FIG. 2 shows an ECC format of CPID.

The ECC appending circuit 11 appends, to CPID, an ECC parity encoded based on the CPID. An ECC format of CPID is shown in FIG. 2. As shown in FIG. 2, the error correction code is an RS (Reed Solomon) code of RS (20, 16, 5), that is, of 20 in code length, 16 in data length and 5 in distance. Thus, by appending an ECC parity to CPID, it is possible to improve the reliability of the bit information when CPID is restored.

The shuffling circuit 12 shuffles 160-bit (20-byte) data resulted from appending of 32-bit ECC to 128-bit CPID using a table formed with random numbers. The shuffling is such that in case the 160-bit data consists of b159, b158, ..., b1 and b0, for example, the bit b159 is moved to the position of the bit b121, b158 is moved to the position of the bit b35, ..., b1 is moved to the position of the bit b142 and b0 is moved to the position of the bit b13. Further, the shuffling circuit 12 scrambles the 160-bit data whose information has thus been permuted in position. More particularly, the scrambling is such that random numbers of 160 bits are generated by the M sequence and exclusive OR between the 160-bit data and random numbers of 160 bits is calculated for each bit. Thereby, a shuffled CPID bit block is provided as a second data. Thus, owing to the shuffling and scrambling by the shuffling circuit 12, the confidentiality of CPID can be improved.

The EDC appending circuit 13 appends, to user data including 16 sectors in total, each including 2048 bytes, a 10-byte sector header and 4-byte EDC on a sector basis. The EDC is encoded based on the user data and sector header to check, when reproducing the user data, whether the data is correct.

The EDC rewrite circuit 14 rewrites EDC on the basis of bit information in the CPID bit block as necessary. For example, when bit information at the first bit in the CPID bit block is "1", one byte (or one bit) of EDC in the first sector is rewritten. If the bit information is "0", the EDC in the first sector is not rewritten. Similarly, concerning the 160-bit bit information in the CPID bit block, EDCs in the 160 sectors are rewritten as necessary.

The scrambling circuit 15 scrambles data of 16 sectors in total, each of the sectors including 2052 bytes, to which EDC has been appended, using an address PSN (Physical Sector Number) as a seed.

Figure 3:
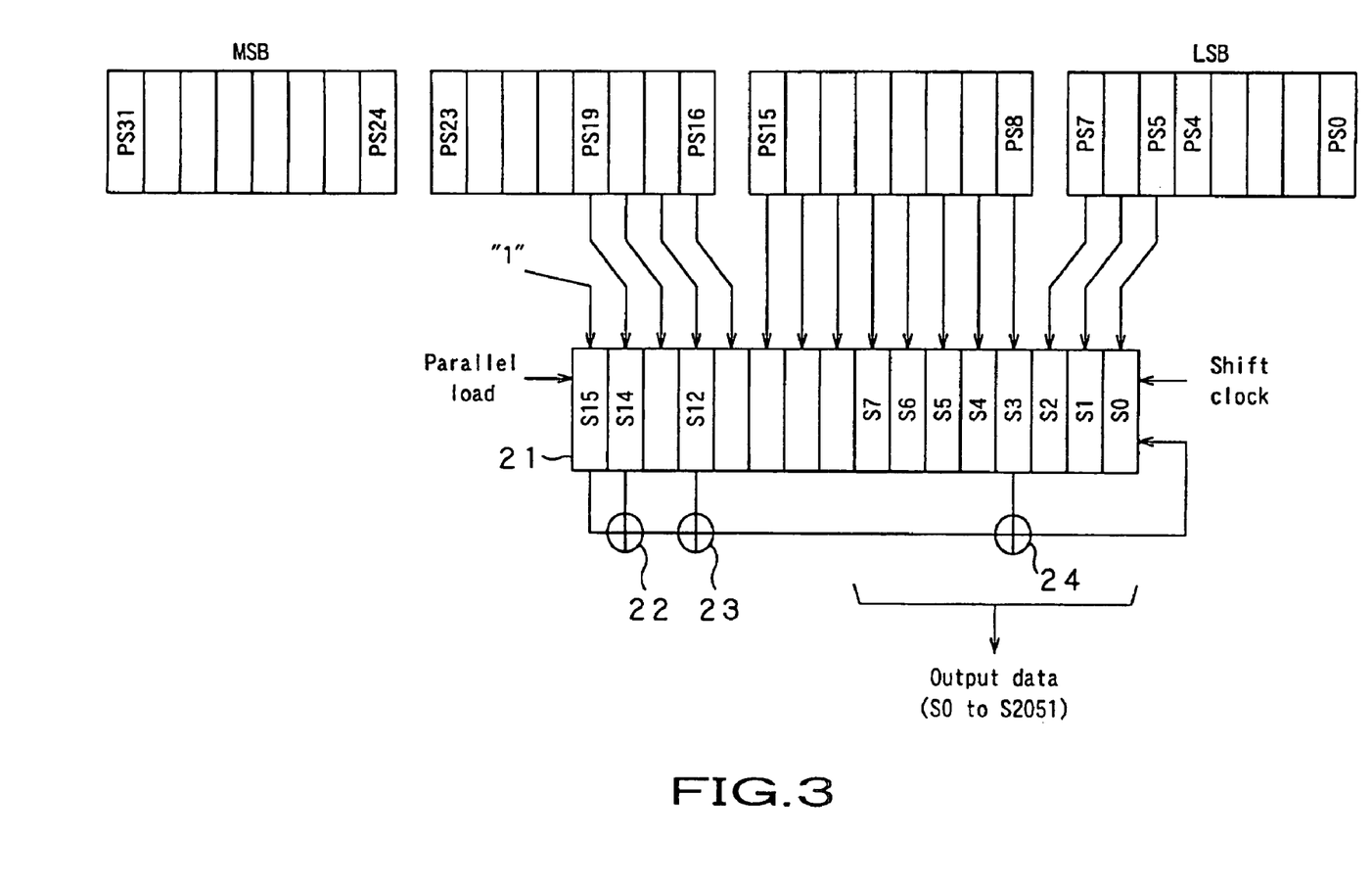
FIG. 3 shows a scrambling circuit in the record signal generator in detail.

The scrambling will be described in further detail with reference to FIG. 3. As shown in FIG. 3, the scrambling circuit 15 includes a 16-bit shift register 21 which is based on a polynomial equation $\phi(x)=X^{16}+X^{15}+X^{13}+X^4+1$, and exclusive OR circuits 22 to 24. The shift register 21 includes registers $S_0$ to $S_{15}$ to shift the value of $S_n$ to $S_n+1$ (n=0, ..., 14) at each shift clock. However, the register $S_0$ is supplied with $S_{15}\$S_{14}\$S_{12}\$S_3$ ($ indicates exclusive OR).

For the scrambling, PSN is preset in the registers $S_0$ to $S_{15}$ at the beginning of a data block to be scrambled. PSN is a physical address for user data of 2 Kbytes in each sector, and expressed with 4 bytes. Since one ECC block has 16 sectors, it includes 16 PSNs. The value to be preset in the register is the first PSN in each ECC block. The values at the 6th to 20th bits (PS5 to PS19 (corresponding to 15-bit ECM block numbers)) counted from LSB (least significant bit) of PSN are preset in the registers $S_0$ to $S_{14}$ and "1" is preset in the resistor $S_{15}$. Outputs from the registers $S_0$ to $S_7$ having the values preset therein are the first output data. Thereafter outputs from the registers $S_0$ to $S_7$ every after eight-bit shift are the next output data.

Eight-bit shift for the 2052-byte data in each sector, having EDC appended thereto, is repeated 2051 times on a 2 Kbyte basis to provide output data S0 to S2051 at each 8-bit shift. It should be noted that since the preset value is the first PSN in each ECC block, the output data S0 to S2051 on a 2 Kbyte basis are equal to each other.

On the assumption that the initial data having EDC appended thereto are UD0 to UD2051, data RD0 to RD2051 in each 2-Kbyte sector recorded in the ECC block are represented by RDk=UDk\$Sk (k=0, ..., 2051).

Figure 4:
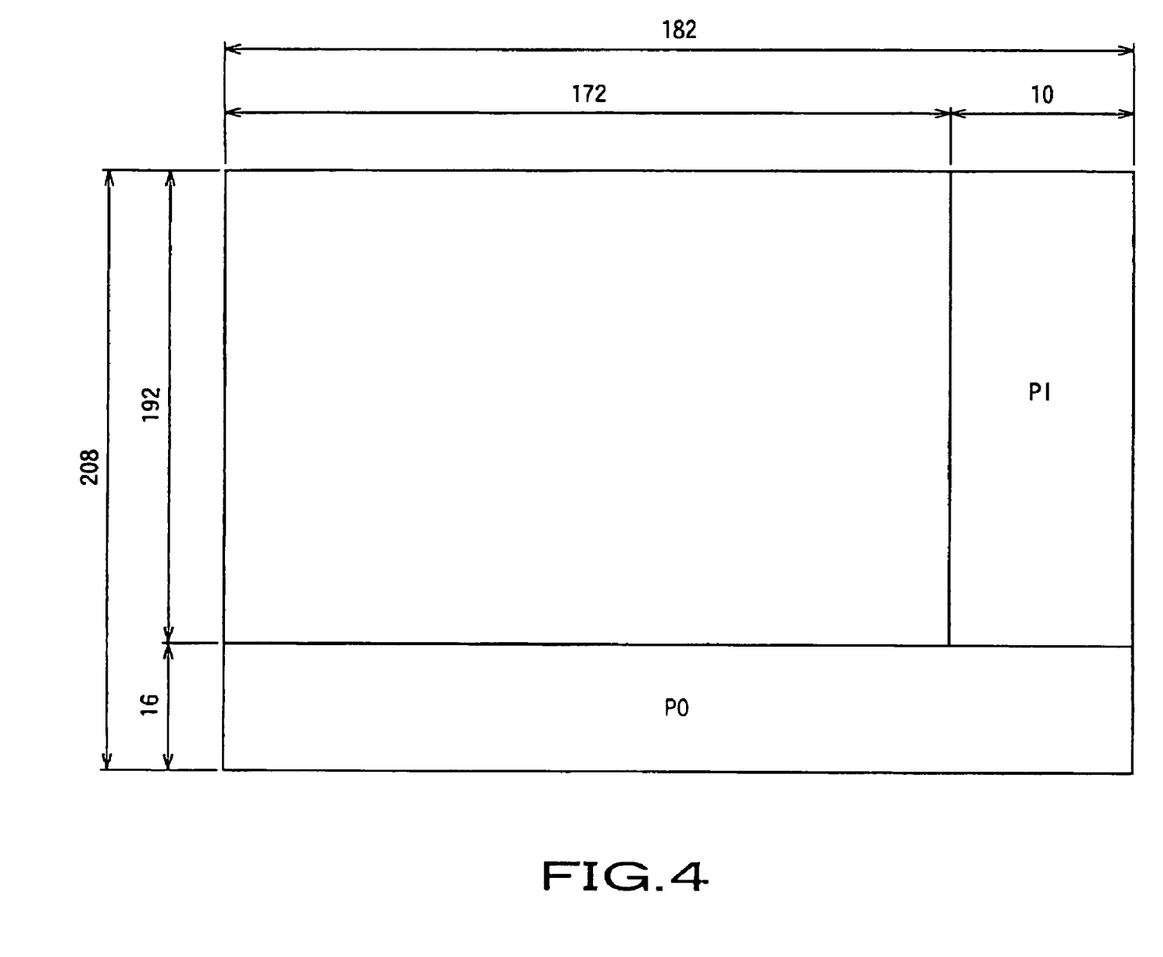
FIG. 4 shows an ECC format of an ECC block.

Description will be made referring back to FIG. 1. The ECC appending circuit 16 appends an ECC parity to data of 16 sectors in total, each of the sectors including 2052 bytes. The ECC format of the ECC block is shown in FIG. 4. As shown in FIG. 4, the ECC block is formed from a product code of an inner code and an outer code. In FIG. 4, PI indicates the parity of the inner code and PO indicates the parity of the outer code. The inner code is RS(182, 172, 11), that is, an RS code of 182 in code length, 172 in data length and 11 in distance. One ECC block includes 192 code words. On the other hand, the outer code is RS(208, 192, 17), that is, an RS code of 208 in code length, 192 in data length and 17 in distance. One ECC block includes 182 code words.

The sync appending circuit 17 appends a frame sync as a sync signal to the beginning of each line in the ECC block, and the modulation circuit 18 carries out 8-16 modulation of the ECC block starting with data in the first line to generate a modulated signal as a record signal.

As above, the record signal generator 10 rewrites EDC appended to the user data in each sector on the basis of the bit information in the CPID bit block. As a result, it will be known that when an error is detected in a sector, the bit information in a CPID bit block corresponding to that sector is "1". Also it will be known that when no error is detected in a sector, the bit information in a CPID bit block corresponding to that sector is "0". Therefore, the result of detecting any error in the 160 sectors corresponding to the bit information of 160 bits in the CPID bit block can be used to restore CPID.

Figure 5:
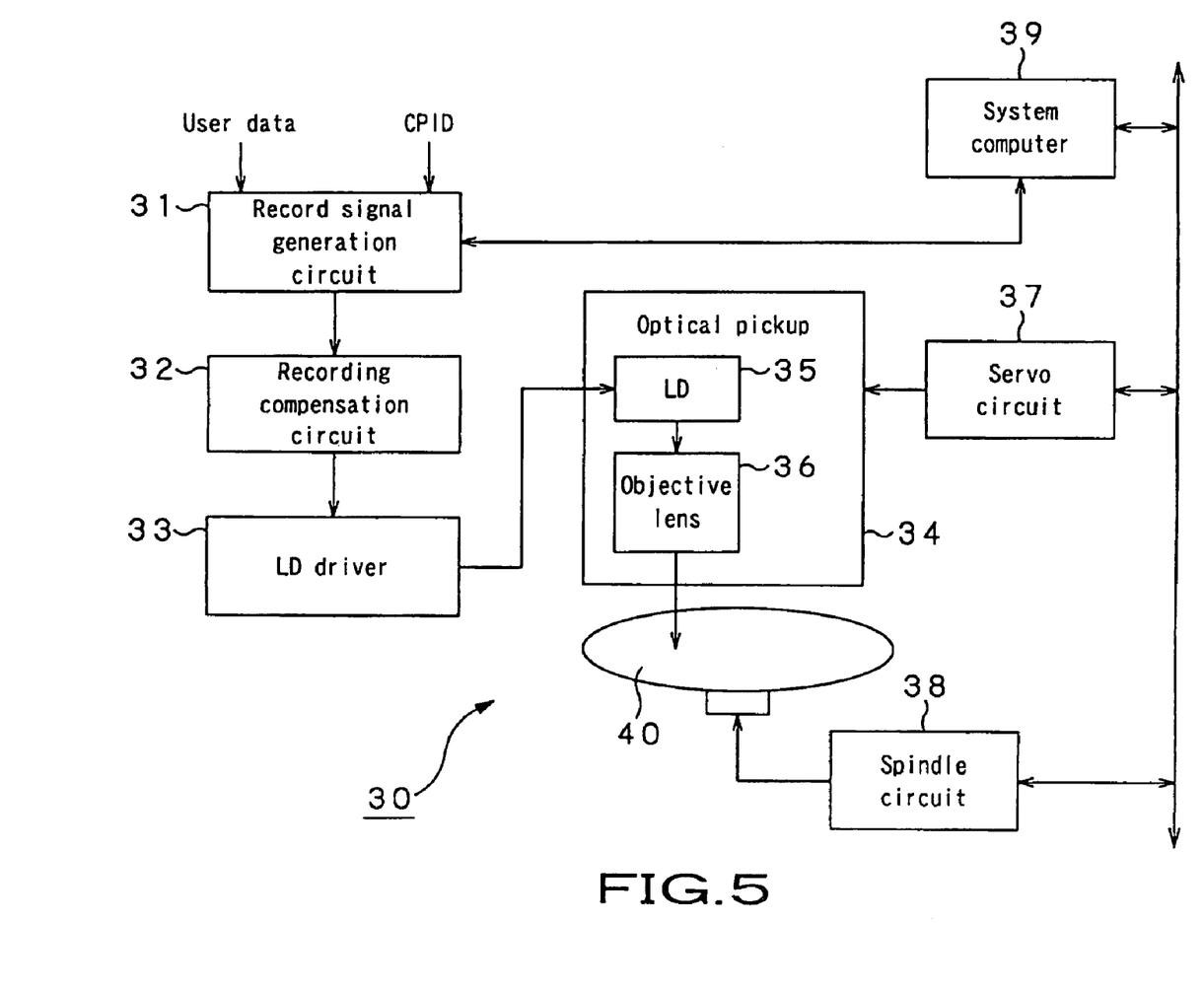
FIG. 5 shows a schematic block diagram of the disk recorder as an embodiment of the present invention.

FIG. 5 is a schematic block diagram of the disk recorder as an embodiment of the present invention in which a record signal including CPID is generated and the record signal is recorded in a master disk. As shown in FIG. 5, the disk recorder 30 includes a record signal generation circuit 31, a recording compensation circuit 32, an LD (laser diode) driver 33, an optical pickup 34, an LD 35, an objective lens 36, a servo circuit 37, a spindle circuit 38, and a system computer 39.

The record signal generation circuit 31 is similar in construction to the record signal generator 10, and generates a modulated signal including CPID. The modulated signal is subjected as a waveform for recording in a master disk 40 to NRZI (Non-Return-to-Zero-Inversion) conversion and then supplied to the recording compensation circuit 32. It should be noted that in the NRZI conversion, when the 8-16 modulated data is "10010100", the modulated signal will be converted to "LLLHHLLL" or "HHHLLHHH".

The recording compensation circuit 32 carries out recording waveform compensation of the recording waveform to provide, for example, a pulse train so that the jitter in playback will be a small waveform.

The LD driver 33 turns on and off the LD 35 of the optical pickup 34 in accordance with the recording-compensated waveform. A light beam from the LD 35 is focused by the objective lens 36 onto the master disc 40 and recorded therein.

The servo circuit 37 conducts the seeking operation of the optical pickup 34, and the spindle circuit 38 controls a spindle motor that rotates the master disk 40. The system computer 39 makes communications with the record signal generation circuit 31 while controlling each of the blocks.

The master disk having the record signal recorded thereon as above is used as a stamper to make a disk substrate by injection molding, and then a reflecting film such as aluminum is coated on the disk substrate and a cover layer is coated on the reflecting film, to thereby produce an optical disk having a CPID.

Figure 6:
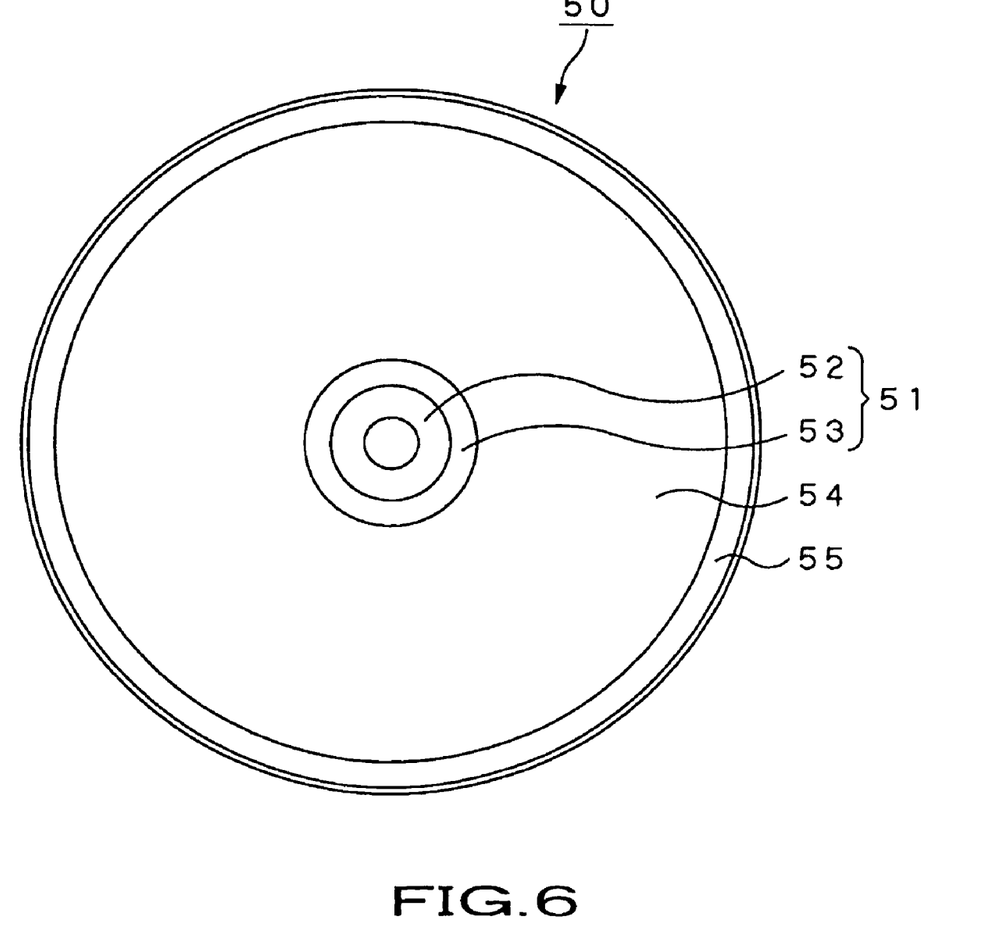
FIG. 6 shows an overall layout of an optical disk.

FIG. 6 shows the overall layout of the optical disk produced as above. As shown in FIG. 6, the optical disk 50 has a central hole, and has also a lead-in area 51, a data area 54, and a lead-out area 55 in a direction from the inner to outer radius.

The lead-in area 51 includes a reserve area 52 formed to extend from the disk center to a radius of 22.6 to 24 mm and having copy protection information such as CPID recorded therein, and a management area 53 having disk management information recorded therein. As above, CPID is recorded in the reserve area. Different from the management area 53 of the lead-in area 51 and the data area 54, the reserve area 52 can have CPID recorded as secret information therein because there is no command for reproducing the user data in the reserve area. Thus, a copy protection system can be implemented that assures a high confidentiality of data.

The data area 54 is formed to extend from the disk center to a radius of 24 to 58 mm, and a content signal of the optical disk 50 is recorded therein.

The lead-out area 55 is formed outer than the radius of 58 mm from the disk center, and has disk management information recorded therein as in the lead-in area 51. The lead-out area 55 is also used as a buffer area for allowing an overrun that may possibly take place during the seeking.

Figure 7:
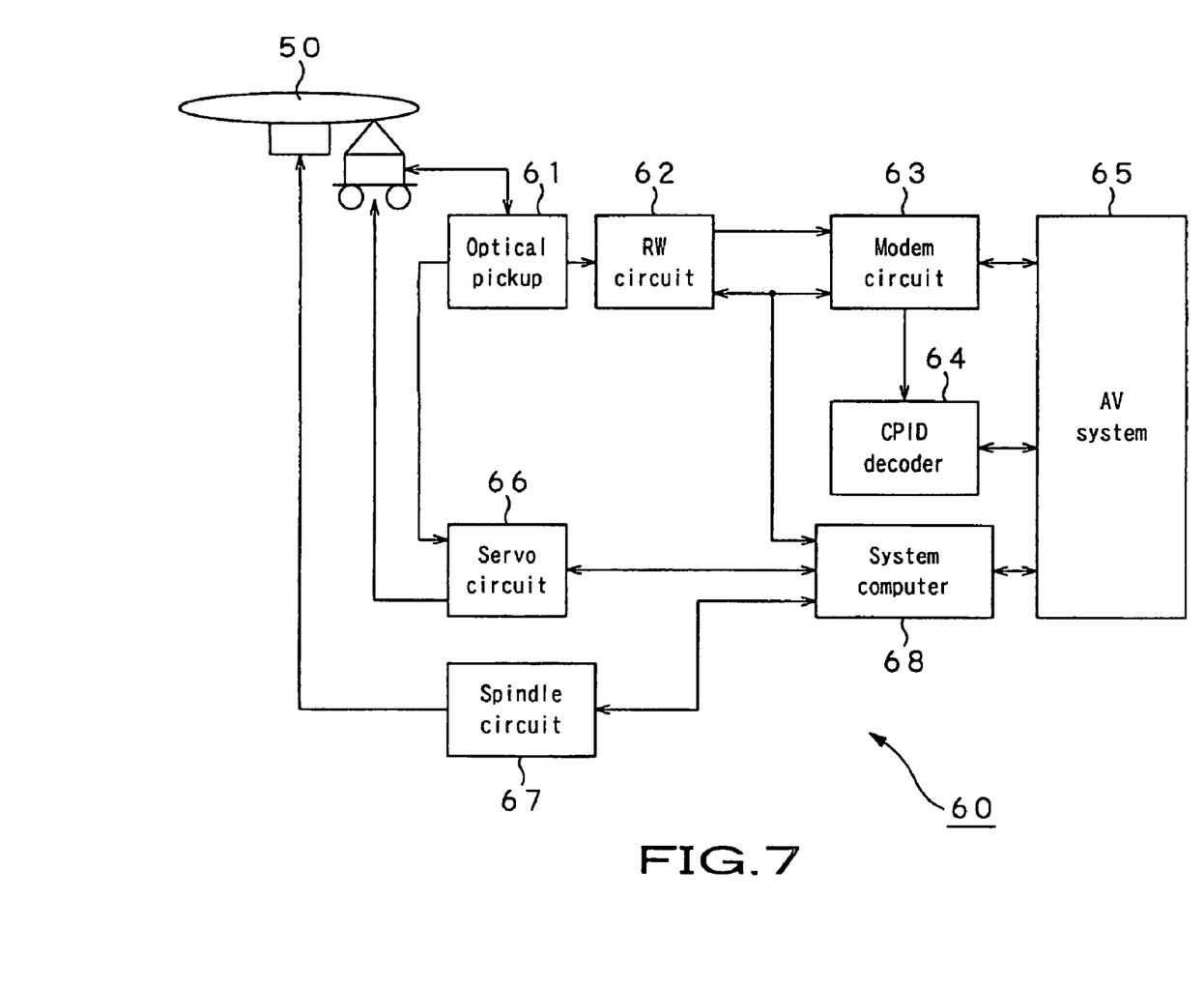
FIG. 7 shows a schematic block diagram of the disk player as an embodiment of the present invention.

FIG. 7 is a schematic block diagram of the disk player as an embodiment of the present invention to reproduce signals recorded in the optical disk 50 produced as above. As shown in FIG. 7, the disk player 60 includes an optical pickup 61, an RW (Read/Write) circuit 62, a modem (modulation/demodulation) circuit 63, a CPID decoder 64, an AV (Audio/Visual) system 65, a servo circuit 66, a spindle circuit 67, and a system computer 68.

The optical pickup 61 is comprised of an optical system including an LD, a playback OEIC (Opto Electronic Integrated Circuit), a biaxial actuator, etc. to read signals from the optical disk 50.

The RW circuit 62 reproduces binary data by PLL (Phase Locked Loop) or the like to generate an 8-16 modulated signal.

Figure 8:
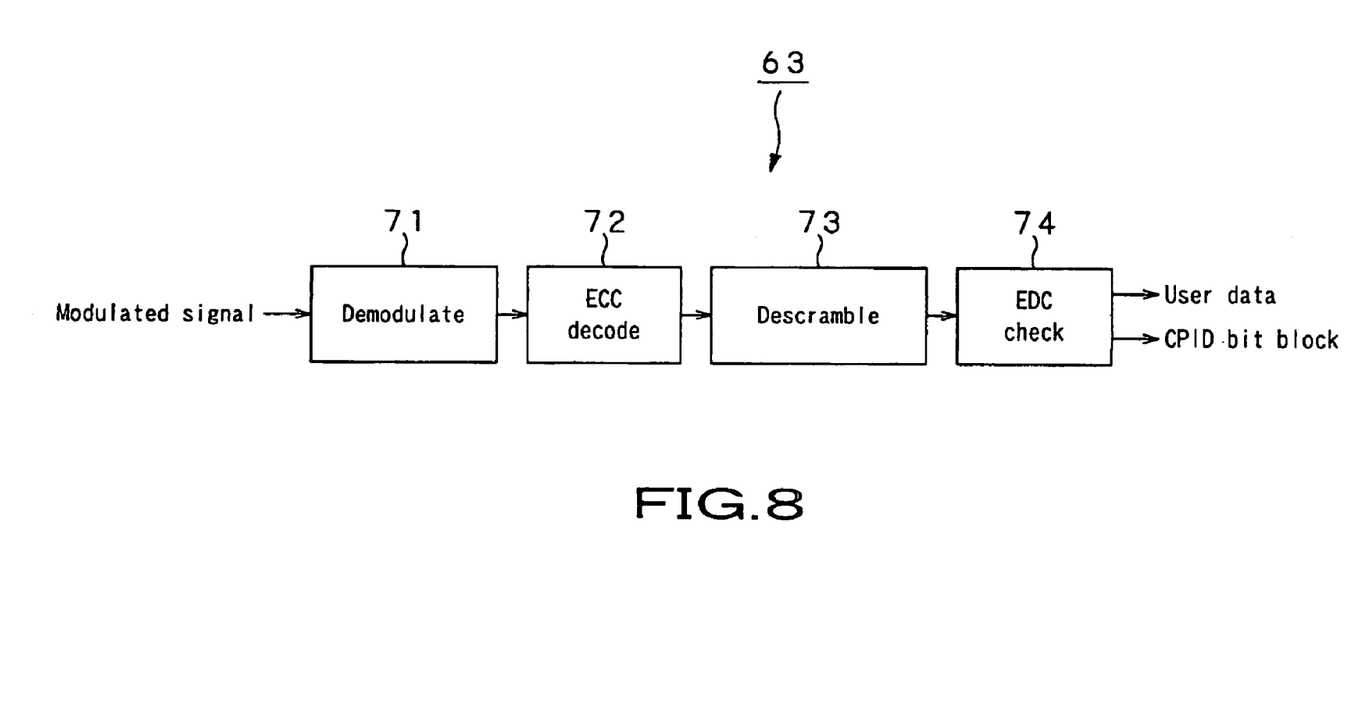
FIG. 8 shows a modem circuit in the disk player in detail.

The modem circuit 63 includes a demodulator 71, an ECC decoder 72, a descrambler 73, and an EDC checker 74 as shown in FIG. 8.

The demodulator 71 detects a frame sync from reproduced signals, makes frame-sync synchronization and demodulates the 8-16 modulated signal on the basis of the timing of the frame-sync synchronization.

ECC decoder 72 carries out error correction on the ECC block using a product code of 192 RS(182, 171, 11) error correction code words in the PI block and 182 RS(208, 192, 17) error correction code words in the PO block.

The descrambler 73 descrambles data of 16 sectors in total, each of the sectors having 2052 bytes with an EDC appended thereto, using an address PSN as a seed.

The EDC checker 74 carries out error-detection checking on each of the 16 sectors. At this time, the EDC checker 74 supplies error detection-checked user data to the AV system 65 for a sector including no CPID. For a sector including CPID, the EDC checker 74 restores CPID bit block on the basis of the result of error-detection checking and supplies the restored CPID bit block to the CPID decoder 64. That is, when an error has been detected in a sector, the EDC checker 74 takes the bit information corresponding to that sector as "1" and restores the CPID bit block. When no error has been detected in a sector, the EDC checker 74 takes the bit information corresponding to that sector as "0" and restores the CPID bit block.

Figure 9:
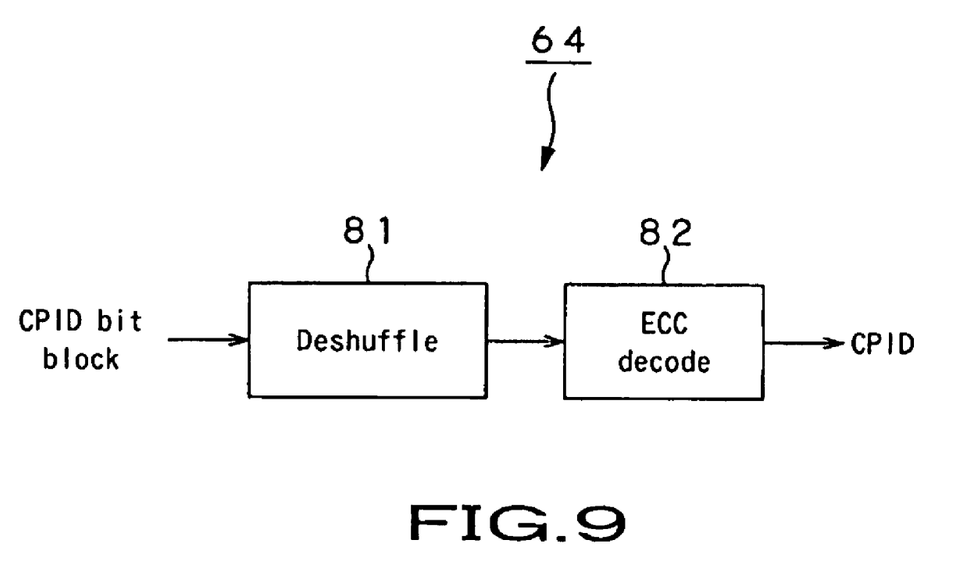
FIG. 9 shows a CPID decoder in the disk player in detail.

The CPID decoder 64 in FIG. 7 includes a deshuffler 81 and ECC decoder 82 as shown in FIG. 9.

The deshuffler 81 descrambles and then deshuffles the CPID bit block to generate 160-bit data in which 32-bit ECC has been appended to 128-bit CPID.

The EDC decoder 82 carries out error correction on the 160-bit data using the RS(20, 16, 5) error correction words to restore 128-bit CPID. The CPID is supplied as key information for copy protection of a content signal to the AV system 65.

The servo circuit 66 in FIG. 7 seeks the optical pickup 61, and the spindle circuit 67 controls a spindle motor that rotates the optical disk 50. The system computer 68 makes communications with the AV system 65 while controlling each of the blocks.

To reproduce CPID in the aforementioned disk player 60, a CPID reproduce command is sent from the AV system 65 to the system computer 68. The system computer 68 acquires address information from the modem circuit 63 and has the servo circuit 66 seek the optical pickup 61 to move the head of the optical pickup 61 to a desired address on the optical disk 50.

Upon receipt of reproduction signal from the optical pickup 61, the RW circuit 62 reproduces signals in the ECC block including CPID using the PLL or similar technique. The modem circuit 63 demodulates, carries out error correction of, and descramble the reproduced modulated signal, and then carries out error-detection check to restore the CPID bit block. The CPID decoder 64 restores CPID from the CPID bit block. The restored CPID is sent from the CPID decoder 64 to the AV system 65 after authentication or the like is made between the AV system 65 and system computer 68.

Note here that CPID cannot be restored from the user data because it has not been recorded as any user data but has been recorded in the form of indication of detection/non-detection of an error in a plurality of sectors via rewriting of EDC appended to user data in each sector on the basis of the bit information in the CPID bit block as above and because there exists no command for reading the EDC content. Therefore, even if user data is copied to any other medium, CPID cannot be restored.

Also, CPID is recorded in the reserve area, and there exists no command for reproducing user data in the reserve area, which is different from the management area 53 in the lead-in area 51 and the data area 54. Therefore, the result of error detection may not be sent to the AV system 65, and it cannot be known that CPID has been recorded.

Also, since ECC is appended to the ECC block after EDC is rewritten based on the bit information in the CPID bit block, EDC will be kept at the rewritten status. Therefore, even if the error correction has been made using ECC, CPID recorded in EDC can be reproduced without being erased, so that a sufficient correction capability can be assured without actually being influenced by any scratch on the optical disk. Further, since ECC is appended to CPID itself, robustness against a reproduction error can be enhanced.

On the other hand, when an AV stream as content signals is reproduced by the disk player 60, a reproduction command is sent from the AV system 65 to the system computer 68. The system computer 68 will acquire address information from the modem circuit 63 and has the servo circuit 66 conduct the seeking operation to move the head of the optical pickup 61 to a desired address.

Upon receipt of reproduction signal from the optical pickup 61, the RW circuit 62 reproduces signals in the ECC block using the PLL or similar technique. The modem circuit 63 demodulates, carries out error correction of, and descramble the reproduced modulated signal, then carries out error-detection check, and sends it as an image reproduction bit stream to the AV system 65. The AV system 65 can judge, depending upon the existence/non-existence of CPID, whether digital signals recorded in the optical disk are original or illegally copied ones. Therefore, the image reproduction bit stream can be decoded and supplied to the outside only when CPID has been sent from the CPID decoder 64. It is also possible to employ such a mode that an image reproduction bit stream is pre-encrypted and the encrypted bit stream is decrypted using CPID.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, it has been described in the foregoing description of the embodiments of the present invention that EDC appended to the user data in each sector is rewritten on the basis of the bit information in the CPID bit block. However, the user data, not the EDC, may be rewritten. That is, a part of the user data and EDC may be rewritten such that an error is detected in a sector when the bit information in the CPID bit block is, for example, "1".

Also, it has been described in the foregoing description of the embodiments of the present invention that copy protection information such as CPID is recorded in the reserve area of the lead-in area. However, the copy protection information may be recorded in the reserve area of the lead-out area.

The invention claimed is:

1. A disk-shaped record medium in which at least a predetermined data is recorded in a first area,
    wherein the predetermined data recorded in the first area includes first data and an error detection code encoded based on the first data appended thereto, and
    wherein the predetermined data and appended error detection code is shuffled in accordance with bit information of data relating to copy protection information (CPID) and the appended error detection code is written to each sector of the disk-shaped record medium,
    wherein the data in each sector is scrambled,
    wherein an error correction code block including a plurality of sectors is modulated with an error correction code and sync signal appended thereto, and
    wherein the modulated signal is recorded on the disk-shaped record medium.

2. The disk-shaped record medium according to claim 1, wherein the data relating to the CPID includes the CPID and the error correction code to CPID.

3. The disk-shaped record medium according to claim 1, wherein the data relating to the CPID has been shuffled to permute information in position.

4. The disk-shaped record medium according to claim 1, wherein the data relating to the CPID has been scrambled to randomize information bits.

5. The disk-shaped record medium according to claim 1, wherein the data relating to the CPID is recorded in a lead-in area.

6. A method of producing a disk-shaped record medium comprising the steps of:
    appending an error detection code to first data;
    shuffling a part of the error detection code in accordance with bit information relating to copy protection information (CPID) and the appended error detection code is written to each sector of the disk-shaped record medium;
    scrambling the data in each sector;
    modulating an error correction code block including a plurality of sectors with an error correction code and sync signal appended thereto;
    making a stamper by recording the first data and error detection code changed in accordance with the bit information of the data relating to the CPID and an error correction code appended thereto in a first area of a master disk; and
    producing the disk-shaped record medium using the stamper.

7. A method of recording in a disk-shaped recording medium comprising:
    recording predetermined data in a first area of the disk-shaped record medium, wherein the predetermined data includes first data and an error detection code encoded based on the first data appended thereto;
    shuffling the predetermined data and appended error detection code in accordance with bit information relating to copy protection information (CPID); and
    writing the appended error detection code to each sector of the disk-shaped record medium,
    wherein the data in each sector is scrambled,
    wherein an error correction code block including a plurality of sectors is modulated with an error correction code and sync signal appended thereto, and
    wherein the modulated signal is recorded on the disk-shaped record medium.

8. A disk recording device, comprising:
   recording means for recording predetermined data in a first area of a disk-shaped record medium, wherein the predetermined data includes first data and an error detection code encoded based on the first data appended thereto;
   a changing means for shuffling the predetermined data and appended error detection code in accordance with bit information in data relating to copy protection information (CPID); and
   writing means for writing the appended error detection code is written to each sector of the disk-shaped record medium;
   wherein the data in each sector is scrambled,
   wherein an error correction code block including a plurality of sectors is modulated with an error correction code and sync signal appended thereto, and
   wherein the modulated signal is recorded on the disk-shaped record medium.

9. A disk playback method of playing a disk-shaped record medium in which at least a predetermined data is recorded in a first area of the disk-shaped record medium, the method comprising:
   carrying out error detection of the data recorded in the first area: and
   restoring the data relating to the CPID in accordance with the result of error detection,
   wherein the data recorded in the first area includes first data and an error detection code encoded based on the first data and an error correction code appended thereto, and
   wherein the predetermined data and appended error detection code is shuffled in accordance with bit information of data relating to copy protection information (CPID) and the appended error detection code is written to each sector of the disk-shaped record medium,
   wherein the data in each sector is scrambled,
   wherein an error correction code block including a plurality of sectors is modulated with an error correction code and sync signal appended thereto, and
   wherein the modulated signal is recorded on the disk-shaped record medium.

10. A disk playback device for playing a disk-shaped record medium in which at least a predetermined data is recorded in a first area of the disk-shaped record medium, the device comprising:
   an error detecting means for carrying out error detection of the data recorded in the first area, and
   a restoring means for restoring the data relating to the CPID in accordance with the result of error detection,
   wherein the data recorded in a first area includes first data and an error detection code encoded based on the first data and an error detection code appended thereto,
   wherein the predetermined data and appended error detection code is shuffled in accordance with bit information of data relating to copy protection information (CPID) and the appended error detection code is written to each sector of the disk-shaped record medium,
   wherein the data in each sector is scrambled:
   wherein an error correction code block including a plurality of sectors is modulated with an error correction code and sync signal appended thereto, and
   wherein the modulated signal is recorded on the disk-shaped record medium.

* * * * *